United States Patent [19]

Campbell

[11] Patent Number: 4,712,650

[45] Date of Patent: Dec. 15, 1987

[54] HOOD CONVEYING APPARATUS HAVING AN OUTWARDLY REACHING BASKET

[75] Inventor: David L. Campbell, Houston, Tex.

[73] Assignee: Pronto Service Facilities, Inc., Austin, Tex.

[21] Appl. No.: 845,566

[22] Filed: Mar. 28, 1986

[51] Int. Cl.$^4$ .......................... B65G 17/16; E04H 3/04
[52] U.S. Cl. ...................................... 186/41; 186/46; 198/797
[58] Field of Search .......................... 186/41, 45–49, 186/50, 53, 57, 26–32; 198/797; 109/19

[56] References Cited

U.S. PATENT DOCUMENTS

| | | | |
|---|---|---|---|
| 1,302,631 | 5/1919 | Buck | 198/797 X |
| 2,865,489 | 12/1958 | Oshanyk | 198/797 |
| 2,904,131 | 9/1959 | Bailey | 186/37 X |
| 4,311,211 | 1/1982 | Benjamin et al. | 186/53 |
| 4,411,336 | 10/1983 | Anders | 186/28 X |

*Primary Examiner*—F. J. Bartuska
*Attorney, Agent, or Firm*—Arnold, White & Durkee

[57] ABSTRACT

A conveying system is provided, which is particularly designed to convey food over a traffic lane to another traffic lane. The system includes a track extending from inside the restaurant, over the adjoining traffic lane or lanes, to a food-receiving station. A chain-driven trolley is coupled to the track and carries a leveling basket for holding the food or other material being conveyed. In the preferred form, the track includes a high-density, polymer plastic defining two chain-receiving parallel grooves and a third, enlarged, parallel groove. The trolley includes a pair of spaced, track-riders shiftably received in the enlarged groove and coupled to one loop of the chain. Preferably, the trolley includes a basket-locking mechanism and the food-receiving station includes an inclined shoulder. The locking mechanism unlocks before the basket reaches the food-receiving station such that upon reaching the food-receiving station the basket contacts the inclined shoulder, pivoting outwardly towards the customer. The system is particularly effective in quickly and reliably delivered food or other material without spillage around a traffic lane or other obstacle upon demand.

18 Claims, 10 Drawing Figures

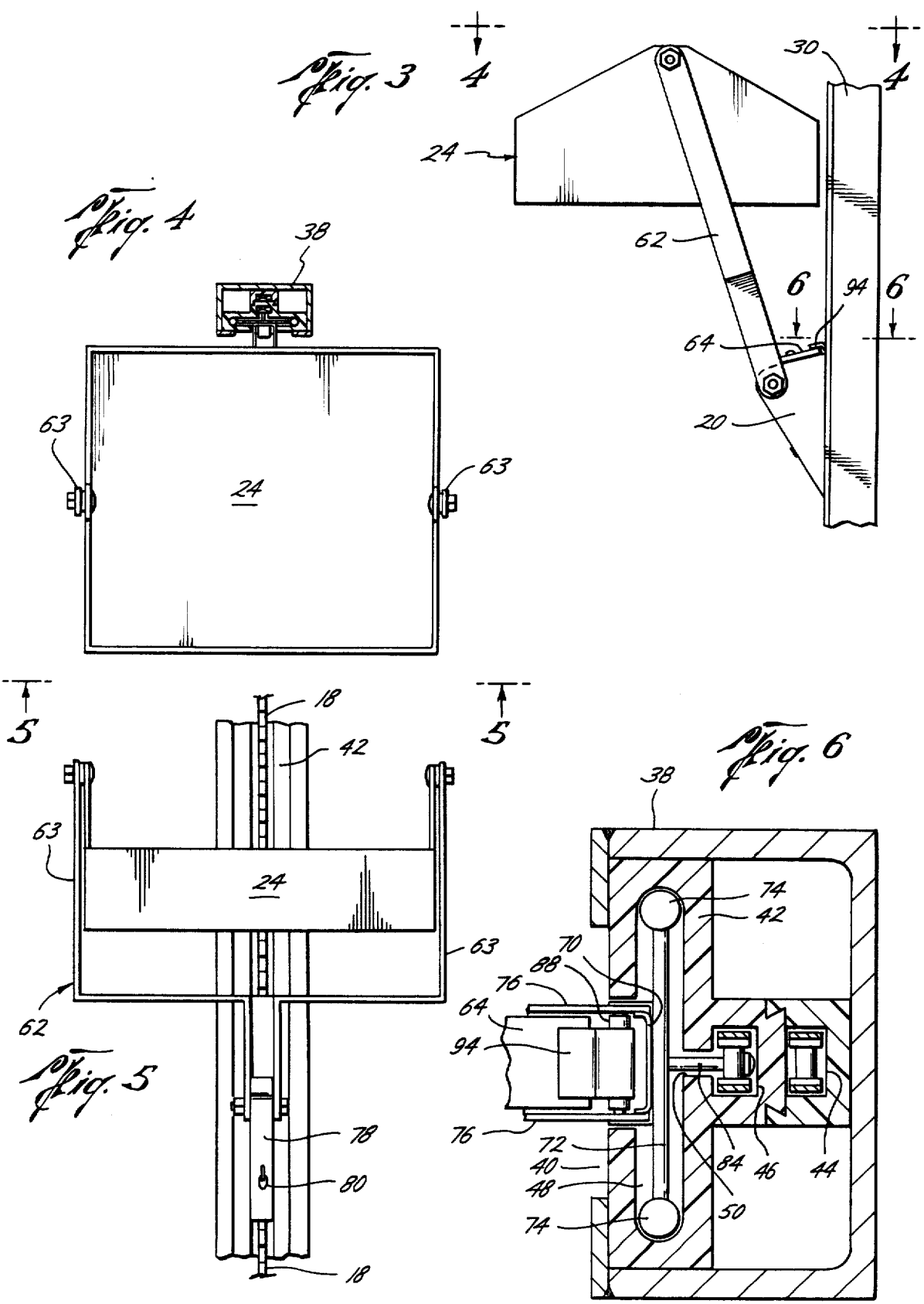

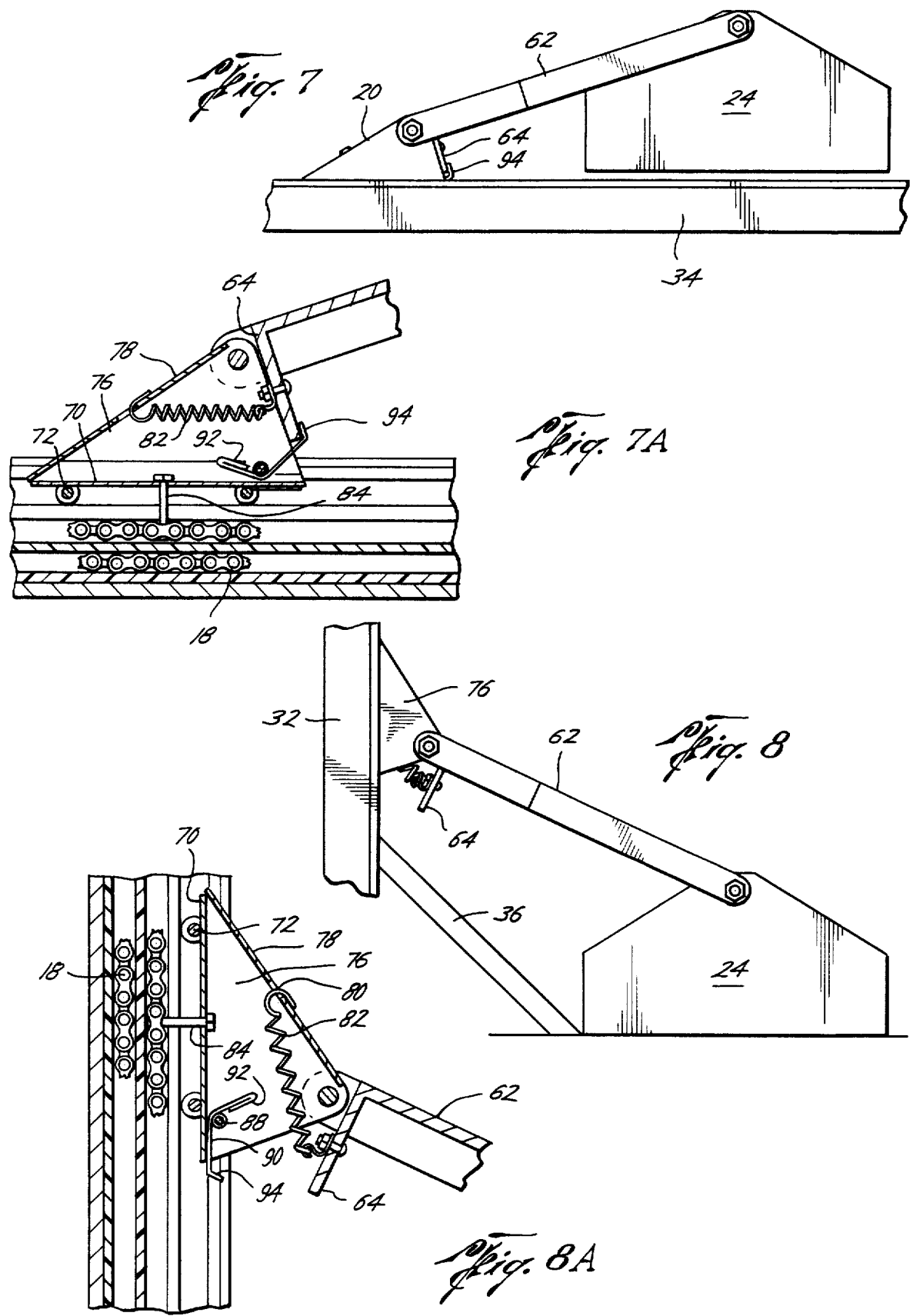

HOOD CONVEYING APPARATUS HAVING AN OUTWARDLY REACHING BASKET

BACKGROUND OF THE INVENTION

1. Field of the Invention

This invention relates generally to a materials handling apparatus for bridging an obstacle such as a traffic lane or the like. In particular, this invention relates to a food conveying apparatus which maintains the food generally level with the ground when transporting the food over a traffic lane or lanes. In its preferred form, the food conveying system includes a pivotal basket carrying the food which is normally locked during transit, and unlocks upon reaching the customer to pivot outwardly towards the customer.

2. Description of the Related Art

In recent years, restaurants, particularly fast food restaurants, have found that so-called "drive-through" service substantially increases sales volume at minimal cost. Such drive-through systems normally simply have a single traffic lane adjacent the restaurant building, with a service window next to the traffic lane. In many instances, such drive-through services have proven very profitable to the restaurant.

In fact, the drive-through food service has proven so successful, that many restaurants would prefer to expand such service to include multiple drive-through lanes. The prime difficulty with such drive-through multiple lanes is efficiently conveying the food from the food service counter to the customer. In the fast food business, it is desirable that the food be conveyed as quickly as possible, without spillage of the drinks or other damage to the food.

Recognizing the need for a food conveying system to serve multiple drive-through traffic lanes, one system has been proposed which would perform such a function. In this system, the speed of delivery is achieved by using electrified track and a powered dolly, much like an electric train. That is, a track extends from the food service counter to the customer food receiving station and a dolly with an electric motor is secured to the track and includes a basket to carry the food. The track is powered by transformers located in the region under the food service counter and when the food is ready for transit, the operator powers the track to convey the food-carrying dolly from the food service counter to the customer.

Although such an electrified system conveys the food relatively quickly from the food service counter to the customer, it is deficient in a number of respects. First, such an electrified system is very expensive to install and maintain. Generally speaking, such electrified tracks are exposed either to the elements or to drink and food spillage which can corrode the tracks and contacts, rendering the system inoperable. More importantly, the transformers that power such a track are relatively large and require substantial periodic maintenance. The placement of such a transformer and other electrical equipment in the region of a food service area has proven particularly deficient in that drinks and food often spills into the region of the transformers and renders them inoperative. Finally, the electric motor powered dolly requires substantial maintenance both on the motor and on the contacts to the track which tend to easily corrode. Probably the most undesirable aspect of this electric system is its cost. As can be appreciated, the initial outlay for such a complicated system is high, and the maintenance cost can be substantial.

SUMMARY OF THE INVENTION

The problems outlined above are generally solved by the conveying system of the present invention. The conveying system hereof does not use an electrified track arrangement, and therefore avoids the many problems associated with such past conveying systems. Nevertheless, the conveying system of the present invention operates quickly to convey the food to the customer while giving a smooth and level ride to the food to prevent undesirable spillage. Although the preferred use of the conveying system outlined herein is to transport food over a traffic lane, it will be appreciated that the conveying system of the present invention has many other useful applications, particularly where it is desired to convey materials of medium bulk quickly over an obstacle while maintaining the material generally level.

Broadly speaking, the conveying system hereof includes a track means extending from a sending station, such as a food service area, to a receiving station, e.g. adjacent the driver's window. The track includes a pair of vertical track sections interconnected by a horizontal track section extending over the traffic lane or obstacle. A belt (e.g. chain) is coupled to the track for movement along the track path of travel and is selectively driven by a motor which is actuatable by the operator. A trolley mechanism is coupled to the track and to the belt such that upon actuation of the motor, the trolley is selectively driven between the sending and receiving stations. A food-carrying basket is provided which is pivotally coupled to the trolley in such a manner to remain generally level when transiting the track.

In a preferred form, the track includes first and second parallel grooves for receiving different sections of the belt or chain which drives the trolley. Preferably, the grooves are defined by a high-density, polymer plastic material which allows the belt to move through the grooves easily, quietly and with little wear. Additionally, the track includes a third, trolley-receiving groove parallel to the belt-receiving grooves. Preferably, the trolley includes a pair of spaced-apart track-riders in the trolley-receiving groove, with the track-riders being connected to one section of the belt. Advantageously, the trolley-receiving groove structure is formed of the same high-density, polymer plastic material such that the track riders are easily slidable therein. Thus, these groove-defining track sections are easily extruded in two or more sections which may be readily interconnected in a tongue-and-groove arrangement.

Preferably, the basket is pivotally connected by an elongated arm structure to the trolley such that the basket is pivotal relative to the arm structure and the arm structure is pivotally mounted to the trolley. A locking mechanism is provided which is operable to lock the arm structure in a static position relative to the trolley most of the time the trolley is transiting the track. The lock mechanism is operable to allow the arm structure to pivot relative to the trolley when the basket approaches the receiving station. Preferably, the receiving station includes an inclined shoulder adjacent the lower most end of the track, such that when the basket approaches the receiving station it will contact the inclined shoulder. When the basket contacts the inclined shoulder, the arm and basket pivot outwardly away from the track towards the customer to make reception of the food much easier.

While the present application specifically discusses a two-lane installation (e.g. FIG. 1) for serving two drive-through lanes of traffic proceeding in the same direction, many other possibilities are contemplated by the present invention. For example, a reverse installation may be provided on one side of the building for the traffic to flow in such a direction that the driver is away from the building, with the conveying system serving the driver's side with the food. Further, the conveying system of the present invention might be used to transit an eating area or other region from the kitchen to the traffic lane. Finally, several of conveying systems can be installed to provide a multi-lane installation—e.g. six traffic lanes.

BRIEF DESCRIPTION OF THE DRAWINGS

FIG. 3 is a fragmentary side elevational view showing the trolley and basket transiting the vertical track section within the restaurant;

FIG. 4 is a view taken along line 4—4 of FIG. 3;

FIG. 5 is a front elevational view taken line 5—5 of FIG. 4;

FIG. 6 is an enlarged, fragmentary, sectional view of the trolley and track section taken along line 6—6 of FIG. 3;

FIG. 7 is a fragmentary, side elevational view showing the trolley and basket transiting the horizontal track section of the present invention;

FIG. 7a is an enlarged, fragmentary, sectional view particularly illustrating the locking mechanism of the present invention with the basket positioned as shown in FIG. 7;

FIG. 8 is a fragmentary, side elevational view depicting the basket pivotally outwardly extended at the receiving station; and FIG. 8a is a fragmentary, sectional view illustrating the release of the locking mechanism for the basket position shown in FIG. 8.

DESCRIPTION OF THE PREFERRED EMBODIMENTS

Figure 1:
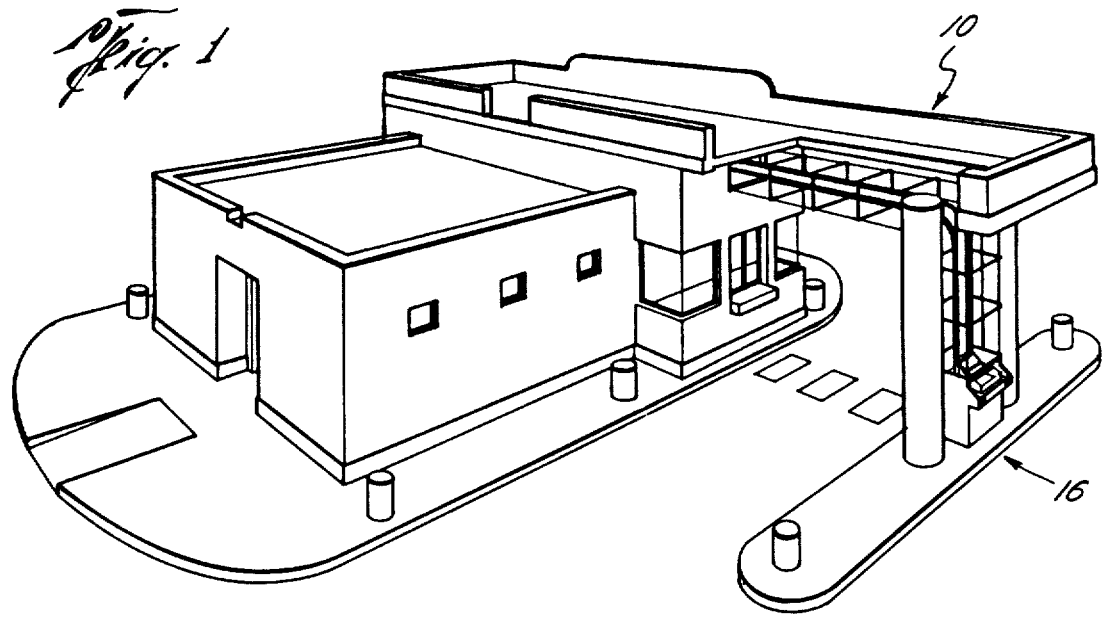
FIG. 1 is a perspective view of a drive-through two-lane installation which incorporates the conveying system of the present, invention.
Figure 2:
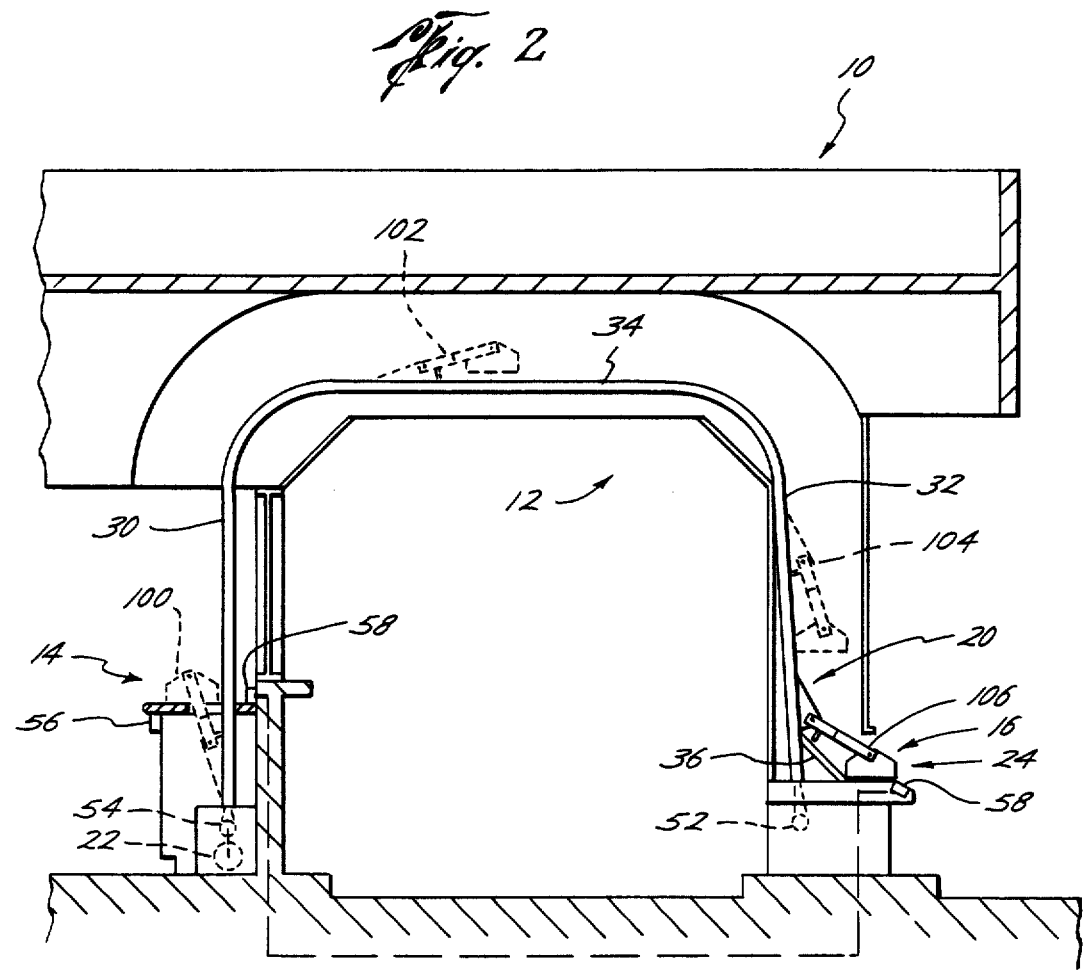
FIG. 2 is a sectional view of the conveying system illustrated in FIG. 1, with the trolley and basket shown in phantom in various positions.

Turning now to the drawing, FIG. 1 illustrates a typical fast food restaurant utilizing the conveying system 10 of the present invention in a two-lane drive-through installation. Broadly speaking, (FIG. 2), the conveying system 10 includes track means 12 extending from a sending station 14 to a receiving station 16 with a belt means, such as a chain 18 (FIGS. 7a and 8a), coupled to the track for movement along the path of the travel defined by the track 12. A trolley 20 is coupled to the track 12 and the chain 18 for movement along the track 12 when the chain 18 is driven by the motor 22. Further, basket 24 is pivotally coupled to the trolley to remain generally level with the ground as shown in FIG. 2.

In more detail, the track mechanism 12 includes a first vertical track section 30 extending upwardly from the sending station 14 and a second vertical track section 32 extending to the receiving station 16. A horizontally oriented section 34 extends over the traffic lane to interconnect the two vertical sections 30, 32 (see FIG. 2). Adjacent the second vertical section 32 at the receiving station 16 is an inclined shoulder 36 oriented obliquely outwardly from the track.

As shown in FIG. 6, the track 12 includes an outer, generally rectangular metal casing 38 having a slot 40 oriented outwardly away from the traffic lane. A carrier structure 42 of high density polymer plastic material is interfitted in the casing 38 and includes parallel chain-receiving grooves 44, 46, as well as trolley-receiving groove 48. Aperture 50 extends the length of the track 12 and interconnects the trolley-receiving groove 48 with the chain receiving groove 46 as shown in FIG. 6. The carrier 42 is easily constructed by extruding the plastic material through a dye which defines the grooves 44, 46, 48. In practice, the carrier 42 is extruded in two parts which are slidably interconnected by a tongue-in-groove arrangement as shown in FIG. 6. That is, a first portion of the carrier 42 defines the chain receiving groove 44 while a second portion of the carrier 42 defines the chain receiving groove 46 and trolley receiving groove 48.

The chain 18 is interfitted into the grooves 44, 46 as shown in FIG. 6. Although practically any continuous loop belt could be used, in practice, a conventional link chain 18 has been found operably advantageous. As shown in FIG. 2, an idle sprocket 52 engages the chain 18 at the receiving station 16, while a driven sprocket 54 engages the chain 18 at the sending station 14. The motor 22 is coupled to the driven sprocket 54 by a split-shaft arrangement for selective operation of the chain 18 in either direction. A control box 56 is provided at the sending station 14 for operation of the motor 22 to drive the chain 18 in either direction. As can be seen in FIG. 2, a speaker/microphone unit 58 is provided both at the sending station 14 and receiving station 16 to provide the customer interface for ordering.

Broadly speaking, the food is conveyed by a receptacle mechanism 60 which includes the trolley 20 and basket 24. The basket 24 is pivotally interconnected to the trolley 20 by an elongated arm structure 62 comprising a pair of outwardly diverging arms 63 coupled to each side of the basket 24 (FIG. 5). The basket 24 is an open container for receiving the food and additionally may include a tray or the like for receiving the drinks for a more stable ride. The elongated arm structure 62 (FIGS. 7-8a) additionally includes a transversely extending flange 64 between the arms 63 adjacent the pivotal interconnection of the arm structure 62 to the trolley 20.

In more detail, the trolley 20 includes an elongated mounting plate 70 having a pair of spaced apart cross members 72 mounted orthogonally relative to the plate 70 (see FIGS. 6, 7a 8a). Transversely mounted at the distal ends of each cross member 72 is a generally cylindrical bullet 74 designed to conform generally to the marginal regions of the trolley-receiving groove 48 as shown in FIG. 6.

A pair of triangularly shaped sidewalls 76 are connected to the plate 70 with a top cover 78 connecting the sidewalls 76 along one marginal edge thereof (FIGS. 7a, 8a). The top cover 78 is apertured as at 80 for receiving spring 82 connected to flange 64. Connecting pin 84 interconnects the plate 70 with a link of the chain 18.

A locking mechanism 86 is coupled to the trolley 20 and operates to lock the arm 62 relative to the trolley 20 when transiting the track sections 30, 34, and to unlock when the basket 24 approaches the receiving station 16.

The locking mechanism 86 includes a hinge pin 88 extending between the sidewalls 76 and a latch 90 pivotally mounted on pin 88. Advantageously, the latch 90 has two arms bent at approximately a 135° angle (FIGS. 7a and 8a) with a weight 92 on one arm and a catch tab 94 on the other arm.

OPERATION

In use, the conveying system 10 has proven effective in quickly, noiselessly, and efficiently transporting food from the sending station 14 to the receiving station 16. As can be appreciated from FIGS. 1 and 2, the vehicle pulls adjacent the receiving station 16 in the lane remote from the food counter or sending station 14. If the driver of the vehicle has not previously ordered his food at a remote location, the driver conveys his order through the speaker/microphone 58 to the employee at the sending station 14. Preferably, the basket 24 is initially set at the receiving station as shown in FIG. 2 to first convey proper payment for the food from the receiving station to the sending station 14. A limit switch on the track 12 or motor 22 is placed at the sending station 14 to stop the basket 24 to rest on the food counter as shown by position 100 (phantom in FIG. 2). When the food order has been filled, the operator preferably informs the driver through the speaker/microphone 58 and actuates the control box 56 to start the motor 22 in the direction of receiving station 16.

Operation of the motor 22 drives the chain 18 with the respective loop or chain sections (FIGS. 6, 7a, 8a ) driving in opposite directions to propel the trolley 20. Advantageously, the chain 18 is slidably received in the grooves 44, 46 defined by the high-density, polymer plastic of carrier 42 to give unrestricted, noiseless movement. As can be appreciated from the drawing, movement of the chain 18 affects corresponding movement of the trolley 20 through the connecting pin 84 (FIG. 6). In similar fashion, the trolley 20 rides quickly and noiseless along the track 12 with the bullets 74 riding within the trolley-receiving groove 48.

FIG. 3 illustrates the relative positions of the track section 30, basket 24, arm structure 62, and trolley 20 as the basket 24 initially ascends away from the sending station 14 (position 100, FIG. 2). In the position 100, the locking tab 94 is pivoted into engagement of the flange 64 to lock the arm structure 62 relative to the trolley 20. As can be appreciated from the arrangement of the weight 92 relative to the tab 94, with the basket 24 and trolley 20 in position 100 tab 94 is biased into locking engagement with the flange 64.

Turning to FIGS. 7 and 7a, the conveying system 10 is depicted in fragment in position 102 (FIG. 2) when transiting the horizontal track section 34. As can be appreciated from FIGS. 7 and 7a, the effect of gravity on weight 92 retains the tab 94 in locking engagement with the flange 64 to lock the arm structure 62 relative to the trolley 20. In position 102, the basket 24 is free to pivot relative to the arm 62 to maintain a generally level orientation. This level orientation prevents or reduces the spillage of the food and drink during transit.

In FIG. 2, position 104 depicts the trolley 20 and basket 24 as it descends the vertical section 32 approaching the receiving station 16. As shown, the basket 24 has now pivoted further relative to the arm structure 62 to remain generally level with the ground. It can also be appreciated (see e.g. FIG. 8a) that the locking mechanism 86 has actuated such that the tab 94 is no longer engaging the flange 64. However, the effect of gravity biases the basket 24 to remain in a generally depending relation to the trolley 20 in position 104.

FIGS. 8 and 8a depict basket 24 in position 106 as it extends outwardly towards the driver of the vehicle. As can be appreciated from FIG. 8, as the basket 24 descends track section 32, it contacts inclined shoulder 36 and is shifted outwardly away from the track section 32. As the basket 24 descends track section 32, the tab 94 has unlocked the flange 64 (FIG. 8a) and allows pivotal movement of the arm structure 62 relative to the trolley 20, as well as pivotal movement of the basket 24 relative to the arms 63. The spring 82 biases the arm structure 62 to bring the flange 64 back adjacent the side walls 76 as the trolley 20 reverses direction back towards the sending station 14.

As can be appreciated from FIG. 2, the constructional arrangement of the trolley 20 and locking mechanism 86 allows the basket to pivot outwardly away from the track 12 so that the customer can easily access his food without getting out of the car or reaching far. Additionally (as shown in FIG. 2), a protective cover may be installed to prevent exposure of the track 12 to the elements, as well as to prevent customer interference with the basket 24 and trolley 20 as it ascends or descends.

Although FIG. 1 depicts the most usual arrangement contemplated by the present invention (i.e. a two-lane installation with the traffic proceeding in the same direction). Many other installation configurations are possible. For example, a multiple lane installation is contemplated much as shown in FIG. 1 with the drive-through traffic proceeding in the same direction with a plurality of conveying systems 10 in accordance with the present invention. Further, a four-lane installation is desirable in many restaurant locations with two lanes of drive-through traffic on each side of the restaurant. In some restaurant locations, traffic is restricted to a certain direction in which case a reverse installation is contemplated similar to the FIG. 1 installation configuration, with the traffic flowing in the opposite direction. In such a reverse installation, the receiving station 16 is oriented towards the restaurant such that the driver of the vehicle can easily access basket 24. Another contemplated installation is adapted for locations where it is desirable to have the drive-through lane adjacent the restaurant with an eating area or other obstacle situated between the kitchen or food counter and the drive-through lane. In this case, the food conveying system 10 of the present invention would transport the food over the eating area to the drive-through lane.

Those skilled in the art will appreciate that many conveying systems are known in the manufacturing industry for conveying parts or product. However, it can be readily seen that the conveying system 10 is applicable to many different types of manufacturing or food conveying processes where it is desirable to retain the materials handling basket in a generally level condition relative to the ground. The conveying system 10 of the present invention is particularly appropriate where it is desired to extend the basket outwardly from the track at a receiving station.

I claim:

1. A conveyance system for transporting food or like material over a traffic lane or obstacle, comprising:
   track means extending from a sending station to a receiving station to define a path of travel and having a pair of vertical track sections and a horizontal track section interconnected to the respective vertical sections and extending over the traffic lane;

belt means operably coupled to the track means for movement along the path of travel generally defined by the track means;

trolley means coupled to the track means for movement along the path of travel generally defined by the track means and coupled to the belt means for concomitant movement therewith;

basket means for receiving the material and pivotally coupled to the trolley means for remaining generally level when moving along the track path of travel;

motor means coupled to the belt means and selectively actuatable for moving the basket means between the sending station and the receiving station, the track means including carrier structure aligned along the path of travel and defining a pair of parallel grooves for receiving sections of the belt means and a trolley-receiving groove aligned with said parallel grooves, and the trolley means including a track-rider shiftably receiving in the trolley-receiving groove, the track-rider being operatively coupled to one of said sections of belt means for movement of the trolley means along said path of travel.

2. A conveyance system according to claim 1, including voice reception and transmission means located proximate the receiving station and located proximate the sending station for enabling verbal communication between the sending and receiving stations.

3. A conveyance system according to claim 1, said basket means being pivotally coupled to a pair of elongated arms pivotally coupled to the trolley means.

4. A conveyance system according to claim 3, including lock means for preventing pivotal movement of the arms relative to the trolley with the trolley transiting the vertical section adjacent the sending station, and for permitting pivotal movement of the arm relative to the trolley with the trolley transiting the vertical section adjacent the receiving station.

5. A conveyance system according to claim 4, the receiving station including an inclined shoulder adjacent the track for pivotally deflecting the basket outwardly away from the track means upon arrival at the receiving station.

6. A conveyance system according to claim 4, the lock means including a pivotal latch counterbalanced by a weight for lockingly engaging a flange connected to the arms during transit of the trolley of the vertical section adjacent the sending station.

7. An apparatus for conveying material over a traffic lane or the like, comprising:

a track disposed around the traffic lane from a sending station to a receiving station;
a basket adapted for receiving the material;
a chain operatively received in the track;
a selectively actuatable motor for driving the chain;
a trolley coupled to the track, chain, and basket for moving the basket between the sending station and the receiving station when the motor is actuated, the track including carrieer structure comprising—
a first elongated groove for receiving one section of the chain,
a second elongated groove, generally parallel to the first section, for receiving another section of the chain,
a trolley-receiving elongated groove, generally parallel to said chain-receiving grooves,
the trolley including pair of track-riders received in said trolley-receiving groove, the track-riders being spaced apart in the longitudinal direction of the trolley-receiving groove,
the trolley-receiving groove including an opening in communication with said second groove and said trolley including a pin operably disposed in said opening for connecting the trolley and said other chain section.

8. An apparatus in accordance with claim 7, said carrier structure comprising a high density polymer plastic material.

9. An apparatus in accordance with claim 8, said carrier structure including a first
integral portion defining said first groove and a second integral portion defiing said second groove and trolley-receiving groove,
the first and second portions including a complemental tongue-in-groove structure for slidably interconnecting the portions.

10. An apparatus in accordance with claim 7, the track-riders each comprising an elongated crossmember having an elongated bullet connected at each distal end, the bullets being longitudinally oriented in the direction of the trolley-receiving groove and dimensioned in close conformity therewith for slidable movement within the trolley-receiving groove.

11. An apparatus in accordance with claim 7, the structure defining said trolley-receiving groove being dimensioned in close proximity relative to the track-riders to permit shifting movement of the track-riders in the longitudinal direction of the trolley-receiving groove while minimizing shifting movements of the track-riders in a transverse direction to the trolley-receiving groove.

12. A material conveyor comprising:

track means adapted for positioning over an obstacle and having a sending station, a first vertical section extending upwardly from the sending station, a horizontal section traversing the obstacle, a second vertical section extending downwardly from the horizontal section, and a receiving station connected to the lower end of the second vertical section, the receiving station including an inclined shoulder oriented obliquely adjacent the lower end of the second vertical section;

belt means operatively coupled to the track means and shiftable therealong; and receptacle means for receiving the material and coupled to the track means and belt means for movement along the track means upon shifting movement of the belt means, the receptacle means including—
trolley means shiftably coupled to the track means,
basket means for receiving the material,
elongated arm structure pivotally coupling the basket means to the trolley means, and
lock means for locking the arm structure relative to the trolley when the trolley means is positioned along the first vertical section, and for releasing the arm structure when the trolley means is positioned proximate the receiving station to allow pivotal movement of the arm structure relative to the trolley means, shifting of the belt means to effect movement of the trolley means to the receiving station causing the basket means to contact the inclined shoulder and pivotally shift outwardly away from the lower end of the second vertical section.

13. A material conveyor in accordance with claim 12, the lock means including a pivotal latch and the arm structure including a flange, the latch being pivotal for engaging the flange to secure the position of the arm structure relative to the trolley means.

14. A material conveyor in accordance with claim 13, the latch including a first arm having a flange-engaging tab and a second arm having a weight.

15. A material conveyor in accordance with claim 13, the latch arms being non-rectilinear, angularly related to each other and pivotally mounted at their joinder to the trolley means for gravity biasing the tab into engagement with the flange as the trolley means transits the first vertical track section and horizontal track section, and for gravity biasing the tab out of engagement with the flange as the trolley means transits the second vertical track section.

16. A material conveyor in accordance with claim 13, the lock means being coupled to the trolley means and the flange being pivotal towards and away from the trolley means, the trolley means including a spring connected to the flange for biasing the flange towards the trolley.

17. A material conveyor in accordance with claim 12, the receiving station including a pedestal extending away from the flower end of the second vertical section, the inclined shoulder extending between said lower end of the second vertical section and said pedestal such that when the basket means is shifted to contact the inclined shoulder, the arm structure pivots relative to the trolley means and the basket means slides onto the pedestal spaced from said lower end.

18. In a conveyance system having a track with receiving and sending vertical track sections adjacent respective receiving and sending stations, a trolley coupled to the track, and a belt coupled to the trolley for shifting the trolley along the track to the receiving station, the improvement comprising:

elongated arm structure having one end pivotally coupled to the trolley and the other end coupled to a basket, means for locking the arm structure relative to the trolley as the trolley transits the sending vertical track section and for allowing the arm structure to pivot as the trolley transits the receiving vertical track section, and shoulder means disposed at the receiving station adjacent said receiving vertical track section for contacting the basket as the trolley moves towards the receiving station to pivot the arm structure relative the trolley and outwardly shift the basket away from the receiving vertical track section.

* * * * *

UNITED STATES PATENT AND TRADEMARK OFFICE
CERTIFICATE OF CORRECTION

PATENT NO. : 4,712,650

DATED : December 15, 1987

INVENTOR(S) : David L. Campbell

It is certified that error appears in the above-identified patent and that said Letters Patent is hereby corrected as shown below:

In the Title, please change "Hood Conveying Apparatus ..." to "Food Conveying Apparatus ..."

In the Abstract, line 20, please delete "delivered" and insert therefor -- delivering --.

In Column 7, line 66, please delete "carrieer" and insert therefor -- carrier --.

In Column 10, line 2, please delete "flower" and insert therefor -- lower --.

Signed and Sealed this

Fourteenth Day of June, 1988

Attest:

DONALD J. QUIGG

*Attesting Officer*

*Commissioner of Patents and Trademarks*